United States Patent
Maretzke et al.

(10) Patent No.: US 6,623,365 B1
(45) Date of Patent: Sep. 23, 2003

(54) TRANSMISSION ELEMENT FOR THE TRANSMISSION OF POWER AND/OR TORQUES, OSCILLATION DAMPER AND METHOD FOR OSCILLATION DAMPING

(75) Inventors: Jürgen Maretzke, Isenbüttel (DE); Jürgen Sellschopp, Braunschweig (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 09/700,230
(22) PCT Filed: Apr. 22, 1999
(86) PCT No.: PCT/EP99/02718
  § 371 (c)(1),
  (2), (4) Date: Nov. 13, 2000
(87) PCT Pub. No.: WO99/58876
  PCT Pub. Date: Nov. 18, 1999

(30) Foreign Application Priority Data

May 12, 1998 (DE) .......................... 198 21 165

(51) Int. Cl.⁷ ................................... F16C 3/00
(52) U.S. Cl. ........................ 464/180; 188/379
(58) Field of Search .................. 464/180, 89; 188/379, 188/380; 74/492, 574

(56) References Cited

U.S. PATENT DOCUMENTS

| | | | | |
|---|---|---|---|---|
| 2,028,930 A | * | 1/1936 | Taylor ...................... 188/379 X |
| 2,586,043 A | * | 2/1952 | Hodgson et al. ............ 188/380 |
| 3,020,980 A | * | 2/1962 | Baker et al. .............. 74/574 X |
| 4,207,957 A | | 6/1980 | Sivers et al. ................... 180/70 |
| 4,406,641 A | * | 9/1983 | Mallet ..................... 464/180 X |
| 4,739,702 A | * | 4/1988 | Kobler |
| 5,036,726 A | * | 8/1991 | Wolf et al. ..................... 74/574 |
| 5,081,881 A | * | 1/1992 | Ide ............................. 74/574 X |
| 5,326,324 A | | 7/1994 | Hamada ..................... 464/180 |
| 5,724,862 A | * | 3/1998 | Hannah et al. .......... 74/574 X |
| 5,725,430 A | * | 3/1998 | Barickman et al. .......... 464/89 |
| 5,816,115 A | * | 10/1998 | Taylor et al. ............. 74/574 X |
| 6,312,340 B1 | * | 11/2001 | Gassen et al. .............. 464/180 |

FOREIGN PATENT DOCUMENTS

| | | | |
|---|---|---|---|
| DE | 1 181 560 | 11/1964 | |
| DE | 36 30 870 | 3/1988 | |
| DE | 37 06 135 | 9/1988 | |
| DE | 40 37 786 | 6/1992 | |
| DE | 44 31 772 | 3/1996 | |
| DE | 197 26 293 | 12/1998 | |
| FR | 1049411 | * 12/1953 | .................. 464/89 |
| GB | 404153 | * 1/1934 | ................. 464/180 |
| JP | 8-233031 | 9/1996 | |
| SU | 1184-989 | * 10/1985 | .................. 188/380 |
| SU | 1681081 A1 | * 9/1991 | .................. 464/89 |

* cited by examiner

*Primary Examiner*—Gregory J. Binda
(74) *Attorney, Agent, or Firm*—Ostrolenk, Faber, Gerb & Soffen, LLP

(57) ABSTRACT

A transmission element assembly for transmitting forces and/or torques, the assembly including a transmission element, a component in effective connection with the transmission element so that the transmission element is asymmetrically excitable into oscillations by the component, and an oscillation damper which is of asymmetrical design and is in effective connection with the transmission element.

8 Claims, 2 Drawing Sheets

TRANSMISSION ELEMENT FOR THE TRANSMISSION OF POWER AND/OR TORQUES, OSCILLATION DAMPER AND METHOD FOR OSCILLATION DAMPING

PRIORITY CLAIM

This is a U.S. national stage of application No. PCT/EP99/02718, filed on Apr. 22, 1999. Priority is claimed on that application and on the following application:

Country: Germany, Application No.: 198 21 165.1, Filed: May 12, 1998.

BACKGROUND OF THE INVENTION

1. Field of the Invention

The invention relates to a transmission element for the transmission of forces and/or torques, in particular for motor vehicles, having an oscillation damper, and to a method for damping oscillations.

2. Description of the Prior Art

Transmission elements are known in an extremely wide range of embodiments and applications. These transmission elements are used to transmit forces and/or torques from one location to another.

In a motor vehicle, for instance, forces and torques are transmitted via linkages or other transmission elements for the purpose of controlling and regulating sequences of motion. The torque produced by the driver at the steering wheel for the purpose of steering the vehicle, for example, is transmitted to the steering gear by a steering column.

Due to a wide range of different factors, there is the risk that the transmission element will be excited into oscillations. These oscillations are generally unwanted and impair comfort.

The use of an oscillation damper for reducing and/or absorbing oscillations is known.

German reference DE 37 061 35 A1, for instance, proposes to suppress unwanted axial oscillations of a compensating coupling of an injection pump drive by means of a damping device. The damping device essentially comprises an elastomeric compound, which is arranged within a hollow shaft and embedded in the center of which is a bolt.

German reference DE 197 26 293, which is a later publication, discloses the fact that bending oscillations of a drive or cardan shaft designed as a hollow shaft can be reduced in an effective manner if an oscillation damper is arranged within the hollow shaft at the point of maximum oscillation. The oscillation damper has a damper mass and an elastic coupling element.

SUMMARY OF THE INVENTION

The problem underlying the present invention is to provide a transmission element and a oscillation damper that have a wider area of application relative to the prior art. The intention is furthermore to provide a method for damping oscillations.

Pursuant to these objects, one aspect of the present invention resides in a transmission element having a component which is in effective connection with the transmission element. The effective connection can be established by means of a form-locking and/or force-locking connection.

Due to the component, the transmission element can be excited into asymmetrical oscillations.

Fundamentally, oscillations occur in various modes. A rigid body which is elastically suspended can be excited into longitudinal oscillations and rotary oscillations, and an elastic body can additionally be excited into bending oscillations and torsional oscillations. A further distinction is drawn between symmetrical and asymmetrical oscillations. In the case of symmetrical oscillations, the oscillatory motion takes place symmetrically with respect to a reference axis of the body. In contrast, asymmetrical oscillations have different amplitudes and frequencies in relation to the reference axis of the body.

The present invention is concerned with asymmetrical oscillations and their damping and absorption on transmission elements. A longitudinal axis of the transmission element is used as a reference axis.

It is self-evident that damping and absorption of oscillations includes any reduction in the amplitudes of motion and the associated effective forces.

To damp the asymmetrical oscillation of the transmission element, an oscillation damper is provided which has asymmetrical damping characteristics, which is in effective connection with the transmission element. By virtue of the design of the oscillation damper, asymmetrical damping properties are achieved, ensuring more effective damping of the asymmetrical oscillations which occur than would be the case with a symmetrical oscillation damper.

The oscillation damper is generally arranged as close as possible to the antinode, i.e. the location of maximum oscillation amplitude, since this is generally the best location for effective oscillation damping.

Asymmetrical oscillations frequently occur at motor-vehicle steering columns, for example. Due to the integration of other components, e.g. airbags and electrical switch elements, and the need to ensure a clear view of the instruments, steering wheels are generally of asymmetrical construction. Since a vehicle predominantly travels straight ahead, the steering wheel as a component is preferably in a central position. In this position, the steering column as a transmission element is excited into different oscillations transversely to the longitudinal axis of the vehicle to those perpendicular thereto as regards the mode and frequency of oscillation.

The oscillation damper can be arranged in the region of an outer wall of the transmission element, thereby making it to easy to fit and to check for adjustment and damage.

If a hollow transmission element is used, it is also possible for the oscillation damper to be arranged within the transmission element. This arrangement saves space and protects the oscillation damper from damage and loss of correct adjustment.

The type of arrangement that is ultimately selected depends on the particular circumstances of the application.

It is also possible to provide a plurality of oscillation dampers on and/or in the transmission element. This is appropriate, in particular, if, for example, a relatively long transmission rod is excited into different modes of oscillation, i.e. there is a plurality of locations of maximum oscillation amplitude. In this case, it is advantageous to fix an appropriately designed oscillation damper at each antinode, i.e. an oscillation damper that is tuned to the respective frequency.

The oscillation damper can have a damper mass and an elastic coupling element, manufactured from elastomeric plastic for example. The effective connection between the oscillation damper and the transmission element is effected via the elastic coupling element.

The elastic coupling element can be of an appropriate design in order to obtain the desired asymmetrical damping properties in the oscillation damper. For this purpose, the elastic coupling element is of more massive construction on a preferred transverse axis than on a transverse axis perpendicular to the preferred transverse axis, it being possible to achieve this, for example, by means of holes, cavities or the absence of material entirely. In the preferred transverse axis, on which the elastic coupling element is massively arranged, there is a greater stiffness, with the result that, in this direction, the oscillation damper has a higher natural frequency. In contrast to this, the elastic coupling element is of more flexible construction, i.e. less stiff, perpendicularly to the preferred transverse axis or in another direction, with the result that the oscillation damper has a lower natural frequency in this direction. The natural frequency of the oscillation damper in each case determines the frequency range in which it damps oscillations occurring in the component connected to it, in this case the transmission element.

If a hollow shaft is used as a transmission element, a sleeve can be arranged between the hollow transmission element and the elastic coupling element of the oscillation damper. The sleeve can be produced cheaply, protects the elastic coupling element from damage during assembly and makes assembly easier.

The damper mass of the oscillation damper can be covered with elastic material, e.g. rubber. The elastic covering damps impact noises that can occur if the damper mass unintentionally makes contact with the transmission element. Moreover, the elastic covering protects both the damper mass and the transmission element from mechanical damage and corrosion.

The elastic covering of the damper mass can also be in the form of projecting knobs. Impact noises are thereby damped even more effectively than with a uniform covering, owing to greater flexibility.

The transmission element can have an adjusting device associated with it. This can be arranged on the transmission element and/or on the oscillation damper. This ensures that the oscillation damper can be mounted securely in the desired position and with the desired orientation on or in the transmission element and remains there. If a hollow shaft is used, adjustment can be accomplished by means of a longitudinal slot in the sleeve of the oscillation damper and by means of a web or pin in the hollow shaft.

Other adjusting devices are possible and known to the person skilled in the art.

The oscillation damper is distinguished by the fact that the coupling element has asymmetrical elastic properties in a plane of action. The oscillation damper has a damper mass and an elastic coupling element connected to it, the coupling element having asymmetrical elastic properties in a plane of action. The coupling element is generally connected effectively both to the damper mass itself and to a component, e.g. a transmission element, which is excited asymmetrically into unwanted oscillations. The effective connection can in each case be established by means of a form-locking and/or force-locking connection.

The asymmetrical elastic properties of the coupling element can be brought about by shaping. The oscillation damper can, for instance, be provided with a shaped elastic coupling element made from a homogeneous material. In this case, the desired asymmetrical damping properties of the oscillation damper are obtained from the fact that, in one direction, in a plane perpendicular to the longitudinal axis of the oscillation damper, the coupling element has a different stiffness than in another direction, e.g. a transverse direction.

However, the oscillation damper can also be provided with an elastic coupling element in which different materials, each with different properties, are combined asymmetrically. In this case, the desired asymmetrical damping properties of the oscillation damper are achieved by virtue of the fact that the asymmetrically designed stiffness of the elastic coupling element is brought about by the differences in the properties, in particular by the differences in stiffness, of the materials combined in it.

It is also conceivable for the elastic coupling element of the oscillation damper to be of asymmetrical design both through shaping and through the combination of different materials and for the desired asymmetrical damping properties of the oscillation damper to be achieved in this way.

The method for damping oscillations, in particular oscillations of a transmission element, is distinguished by the fact that the damping takes place in different directions in a plane of action, with a different damping stiffness in each case. This results in asymmetrical damping which, as already explained above, leads to good results in certain cases.

The invention is explained in greater detail below by way of example with reference to a steering column of a motor vehicle.

BRIEF DESCRIPTION OF THE DRAWINGS

In the drawing, in each case in schematic representation.

DETAILED DESCRIPTION OF THE PREFERRED EMBODIMENTS

Figure 1:
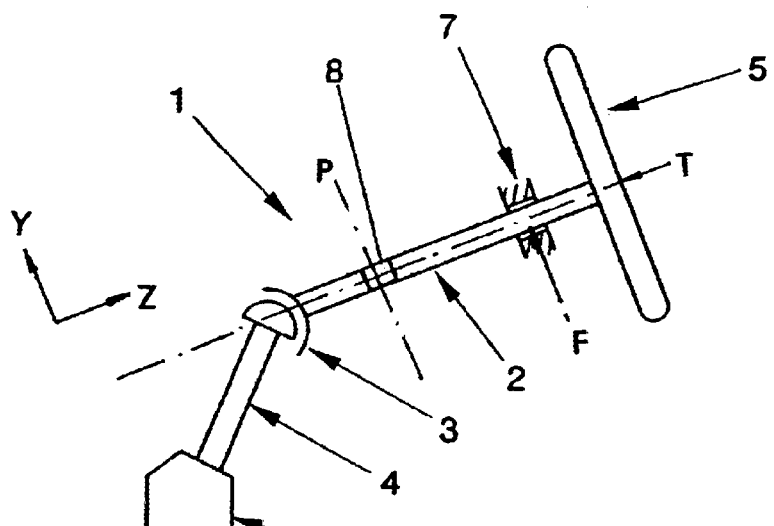
FIG. 1 shows a side view of a transmission element.

FIG. 1 shows a transmission element 1, which is designed as a steering column and has a first, hollow steering rod 2, a universal joint 3 and a second steering rod 4. The transmission element 1 transmits the rotary motion T of a steering wheel 5 to a steering gear 6. Close to the steering wheel 5, the steering rod 2 is arranged rotatably in a bearing 7. Vibration and shocks F that occur in the vehicle excite the steering rod 2 to perform bending oscillations. Since the frequencies and modes of oscillation that are excited perpendicular to the plane of the drawing are different to those excited in the plane of the drawing, oscillations that are asymmetrical with respect to the longitudinal axis Z of the steering rod 2 occur in the steering rod 2. This asymmetry is intensified by the asymmetrical design of the steering column's stiffness.

Figure 2:
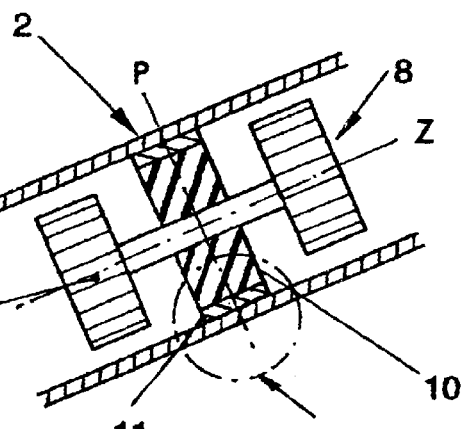
FIGS. 2 and 2A show a longitudinal section through an oscillation damper.

An oscillation damper 8 is arranged at a suitable location within the hollow steering rod 2 to damp the asymmetrical oscillations. As shown in FIG. 2, this oscillation damper 8 essentially comprises a damper mass 9, which is of compact construction and, in the center, has a neck. At this neck, the damper mass 9 is connected to an elastic coupling element 10. The elastic coupling element 10 is surrounded by a sleeve 11, by means of which the oscillation damper 8 is connected to the transmission element 2, thus establishing an effective connection.

Figure 2A:
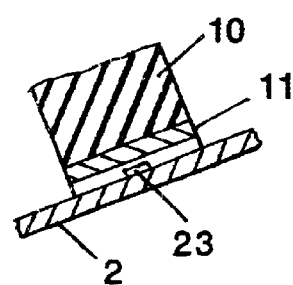

FIG. 2A shows an adjusting device 23 formed as a pin in the steering rod 2.

Figure 3:
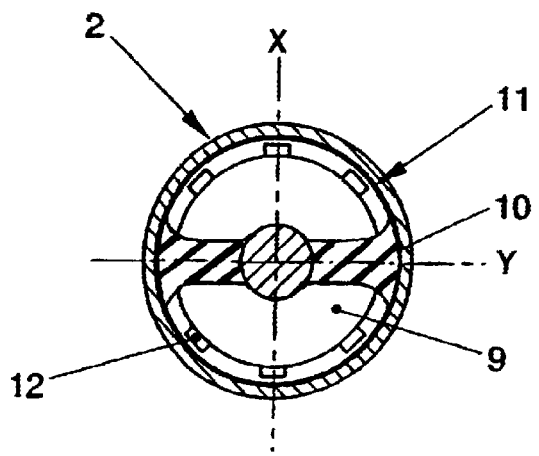
FIG. 3 shows a cross section through an oscillation damper.

As shown in cross section in FIG. 3, the elastic coupling element 10 is of a design with respect to a longitudinal axis Z so as to provide asymmetrical damping characteristics. Along one axis Y (first transversal direction) of the plane of action P, the elastic coupling element 10 has solid and hence rigid characteristics while, perpendicular to this (along the X axis in a second transversal direction), it has more flexible and hence softer characteristics owing to the absence of material. In the direction of the axis Y in which it is of stiff construction, the oscillation damper 8 damps a high frequency while, in the direction of the axis X in which it is of soft construction, it damps a low frequency. The oscillation damper 8 thus has asymmetrical damping properties.

FIG. 3 furthermore illustrates knobs 12, with which the damper mass 9 is covered and which can be composed of rubber, for example. By means of this covering, impact noises are damped and damage is avoided, something that can occur if the damper mass 9 unintentionally makes contact with the steering rod 2 in certain modes of oscillation.

Figure 4:
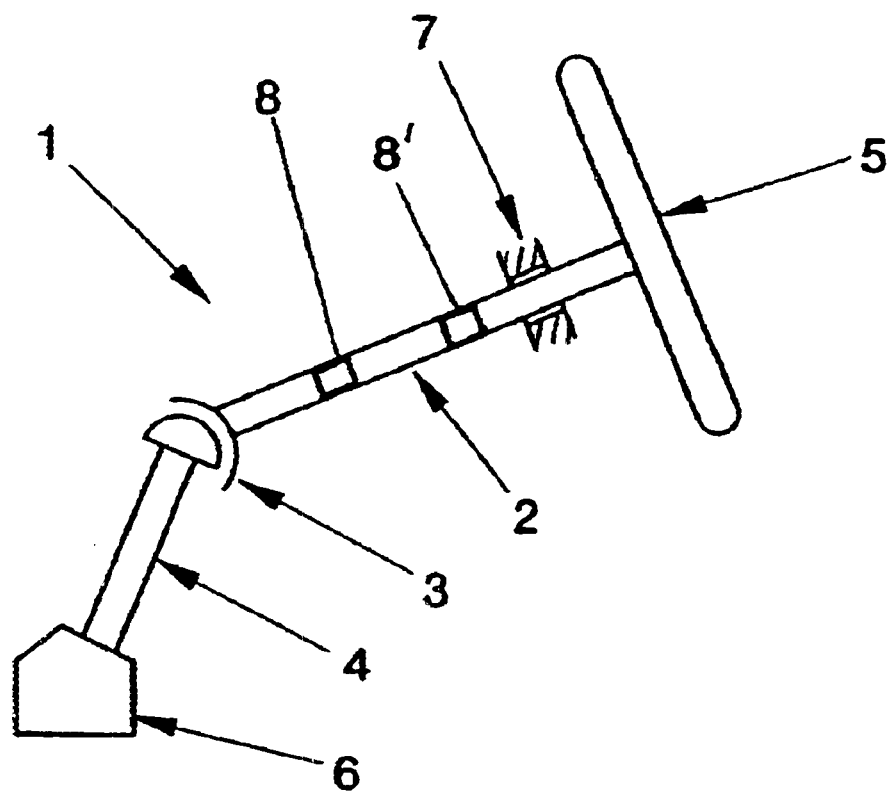
FIG. 4 shows a view similar to FIG. 1 with two dampers.

FIG. 4 shows an embodiment having two oscillation dampers 8, 8'.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A transmission element assembly for transmission of forces and/or torques in a motor vehicle, comprising:

a vehicle components;

a transmission element that transmits forces and/or torques from one location on the transmission element to another location on the transmission element and is in effective connection with the vehicle component so that the transmission element is asymmetrically excitable by the vehicle component into oscillations of different amplitudes and frequencies in relation to a reference axis of the transmission element; and an oscillation damper which is in effective connection with the transmission element, is located between the two locations, and has a damper mass and an elastic coupling element arranged between the damper mass and the transmission element, the elastic coupling element having asymmetrical damping characteristics so as to provide a higher damping stiffness in a first transversal direction perpendicular to the reference axis than in a second transversal direction and the reference axis.

2. The transmission element assembly as defined in claim 1, wherein the oscillation damper is arranged within the transmission element.

3. A transmission element as defined in claim 1, wherein a plurality of oscillation dampers are provided.

4. A transmission element assembly as defined in claims 1, wherein the coupling element has an asymmetrical construction.

5. A transmission element assembly as defined in claim 1, and further comprising a sleeve-arranged between the transmission element and the elastic coupling element of the oscillation damper.

6. A transmission element assembly as defined in claim 1, wherein the damper mass of the oscillation damper is covered with elastic material.

7. A transmission element assembly as defined in claim 6, wherein the elastic material is knob-shaped.

8. A transmission element assembly as defined in claim 1, and further comprising an adjusting device associated with the transmission element.

\* \* \* \* \*